United States Patent
Yang et al.

(10) Patent No.: US 6,389,571 B1
(45) Date of Patent: *May 14, 2002

(54) APPARATUS AND METHOD FOR GENERATING INTERLEAVE ERASURE LOCATIONS FROM THERMAL ASPERITY ERASURE POINTERS

(75) Inventors: Honda Yang, Santa Clara; John T. Gill, III, Stanford, both of CA (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,913

(22) Filed: Nov. 16, 1998

(51) Int. Cl.$^7$ ............................................ G11C 29/00
(52) U.S. Cl. ...................................... 714/766; 714/762
(58) Field of Search ............................. 714/762, 763, 714/764, 765, 770, 771, 772, 752, 746, 710; 360/53

(56) References Cited

U.S. PATENT DOCUMENTS

| | | | |
|---|---|---|---|
| 5,701,304 A | * 12/1997 | Glover et al. | 714/710 |
| 5,701,314 A | 12/1997 | Armstrong et al. | 371/40.3 |
| 5,719,884 A | 2/1998 | Roth et al. | 371/37.4 |
| 5,751,733 A | * 5/1998 | Glover | 714/765 |
| 5,805,617 A | 9/1998 | Im | 371/37.12 |
| 5,844,919 A | * 12/1998 | Glover et al. | 714/769 |
| 5,872,800 A | * 2/1999 | Glover et al. | 714/766 |
| 6,040,953 A | * 3/2000 | Malone et al. | 360/53 |

OTHER PUBLICATIONS

S. Lin and D. Costello, Jr., "Error Control Coding", Published 10–82, ©1983, Prentice–Hall, Inc. Englewood Cliffs, NJ, pp. 167–174.

Unknown, "Chapter 1, Introduction".
S. Wilson, "Digital Modulation and Coding", 1996, Ch. 5, pp. 470–472, Prentice–Hall, NJ.
N. Glover and T. Dudley, "Practical Error Correction Design for Engineers", 1991, Cirrus Logic, Inc., CO, Rev. $2^{nd}$ Ed.
W.W. Peterson and E.J. Weldon, Jr., "Error–Correcting Codes", 1972, ($12^{th}$ printing 1994), Mass, Inst. Of Technology, pp. 131–136.
Stephen B. Wicker, "Error Control Systems for Digital Communication and Storage", CH. 9, "The Decoding of BCH and Reed–Solomon Codes", pp. 203–234, 1995 Prentice Hall, NJ.

* cited by examiner

*Primary Examiner*—Albert Decady
*Assistant Examiner*—Emeka J. Amanze
(74) *Attorney, Agent, or Firm*—Martine & Penilla, LLP

(57) ABSTRACT

Disclosed is a thermal asperity pointer processing apparatus and method for processing apparatus for generating erasure locations from a thermal asperity signal. The thermal asperity signal indicates an error burst in an interleaved data sector. The apparatus includes a thermal asperity pointer recorder, a storage unit, and a thermal asperity pointer processing unit. The thermal asperity pointer recorder is adapted to receive a thermal asperity signal and is configured to generate a thermal asperity event information associated with the thermal asperity signal. The thermal asperity event information includes a thermal asperity duration, a starting interleave number, and a starting interleave address of the thermal asperity signal in the interleaved data sector. The storage unit is configured to receive the thermal asperity event information from the thermal asperity pointer recorder and is configured to store the thermal asperity duration, starting interleave number, and starting interleave address associated with the thermal asperity signal. The thermal asperity pointer processing unit is coupled to receive the thermal asperity event information from the storage unit and is adapted to generate the erasure locations for interleaves corresponding to the error burst in the data sector.

26 Claims, 13 Drawing Sheets

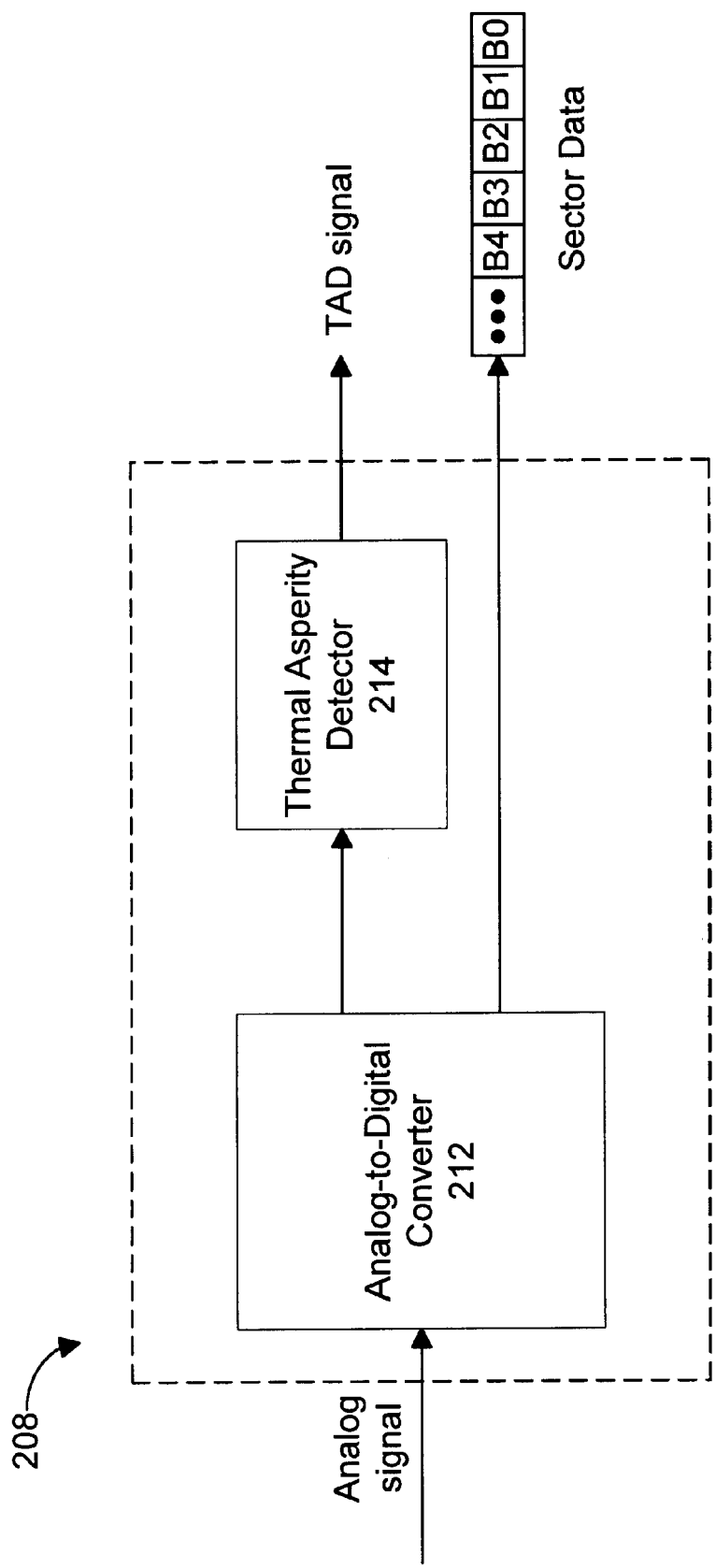

| Binary Interleave Address | Interleave Address for Sector bytes |||
|---|---|---|---|
| | Interleave 2 | Interleave 1 | Interleave 0 |
| 184 | | | 552 |
| 183 | 551 | 550 | 549 |
| 182 | 548 | 547 | 546 |
| ••• | ••• | ••• | ••• |
| 2 | 8 | 7 | 6 |
| 1 | 5 | 4 | 3 |
| 0 | 2 | 1 | 0 |

Sector Data

US 6,389,571 B1

APPARATUS AND METHOD FOR GENERATING INTERLEAVE ERASURE LOCATIONS FROM THERMAL ASPERITY ERASURE POINTERS

BACKGROUND OF THE INVENTION

1. Field of the Invention

This invention relates generally to error detection and correction devices, and more particularly to devices and methods for determining erasure locations for interleaves from thermal asperity events.

2. Description of the Related Art

Modern computer systems generally include one or more hard disk drives to store data and programs. Hard disk drives typically store information in sequence using magnetic technology. Like most recording technology, reading the sequential data bits from a hard disk often generates errors due to noise, manufacturing imperfections of the physical medium, dust, etc.

To detect and correct such errors, hard disk drives typically implement an error correction code (ECC) scheme in writing to and reading from magnetic disk drives such as a hard disk drive. These magnetic disk drives generally include error detection ad correction circuitry that implement ECC schemes using well known codes such as Reed-Solomon code to encode user data for reliable recovery of the original data through an ECC decoder. This helps to achieve a higher areal density.

Prior Art FIG. 1 illustrates a block diagram of a conventional computer system 100 including a hard disk drive 102 and a host computer 104. The host computer 104 receives user data from a hard disk drive 102. A hard disk 106 in the hard disk drive 102 contains data laid out in a plurality of sectors along a plurality of tracks. When reading data from the hard disk 106, the hard disk drive 102 rotates the hard disk 106 by means of a motor 122 and employs an actuator 120 to search for a track and sectors that contain the desired data. Upon finding the desired sectors, the read/write head 116 attached to the actuator 120 sequentially reads the data from the disk 106 to generate analog read signal (e.g., analog data signal). An amplifier 108 is coupled to the read/write head 116 to receive the read signal. The amplifier 108 amplifies the received analog read signal and transmits the amplified read signal to a read channel circuitry 110.

The read channel circuitry 110 includes an analog-to-digital converter (ADC) 112. The read channel circuitry 110 uses the ADC 112 to convert the amplified read signals into digital data bits. The read channel circuitry 110 then transmits the digital data to a deserializer 116. The deserializer 116 receives the sequential data and converts the data into a series of blocks called sectors, each of which is typically 512 bytes of user data and ECC bytes appended to the user data bytes. The deserializer 116 sequentially transmits the sectors to an error detection and correction (EDAC) circuitry 118. The EDAC circuitry 118 detects errors in the received sector and, if correctable, corrects the detected errors using an ECC scheme. Typically, the EDAC circuitry 118 employs conventional Reed-Solomon code in its ECC scheme to encode user data for reliable recovery of the original data. The EDAC circuitry 118 then transmits the error corrected user data to the host computer 104.

In reading from the hard disk 106 however, the read/write head 116 often encounters an asperity on the surface of the hard disk 106. In such an event, the asperity typically causes a sudden shift (e.g., rise in voltage) in the base line of the read signal, which decays exponentially. To detect such thermal asperity (TA) event, the read channel circuitry may include a TA detector 114, which detects a TA event when the read signal deviates from a predetermined signal voltage by a specified amount.

Additionally, modern ECC schemes typically implement interleaving to break up error bursts. In a typical ECC scheme, a conventional ECC decoder decodes errors on an interleave basis. For example in an i-way (i.e., i degree) interleave, the ECC decoder decodes errors on ith data bytes independent of other non-ith data bytes.

Thus, what is needed is a method and apparatus that can record thermal asperity erasure pointer information for inter-leaved ECC codes. In addition, what is needed is a a method and apparatus that can efficiently extract thermal asperity erasure pointer information for interleaved ECC decoding.

SUMMARY OF THE INVENTION

Broadly speaking, the present invention fills these needs by providing an apparatus and method for generating erasure locations of interleaves, which are being decoded. It should be appreciated that the present invention can be implemented in numerous ways, including as a process, an apparatus, a system, a device, a method, or a computer readable medium. Several inventive embodiments of the present invention are described below.

In one embodiment, the present invention provides a thermal asperity pointer processing apparatus for processing apparatus for generating erasure locations from a thermal asperity signal. The thermal asperity signal indicates an error burst in an interleaved data sector. The apparatus includes a thermal asperity pointer recorder, a storage unit, and a thermal asperity pointer processing unit. The thermal asperity pointer recorder is adapted to receive a thermal asperity signal and is configured to generate a thermal asperity event information associated with the thermal asperity signal. The thermal asperity event information includes a thermal asperity duration, a starting interleave number, and a starting interleave address of the thermal asperity signal in the interleaved data sector. The storage unit is configured to receive the thermal asperity event information from the thermal asperity pointer recorder and is configured to store the thermal asperity duration, starting interleave number, and starting interleave address associated with the thermal asperity signal. The thermal asperity pointer processing unit is coupled to receive the thermal asperity event information from the storage unit and is adapted to generate the erasure locations for interleaves corresponding to the error burst in the data sector.

In another embodiment, the present invention provides a method for generating erasure locations from a thermal asperity signal that indicates an error burst in a data sector having a plurality of interleaved data bytes. The method includes: (a) receiving a thermal asperity signal; (b) determining a thermal asperity event information that characterizes the received thermal asperity signal; (c) storing the thermal asperity event information; (d) accessing the stored thermal asperity event information; and (e) determining erasure locations for the interleaved data bytes from the stored thermal asperity event information.

In yet another embodiment, an apparatus for generating erasure locations from a thermal asperity signal is disclosed. The thermal asperity signal indicates an error burst in a data sector having a plurality of interleaved data bytes. The apparatus includes means (a) means for receiving a thermal asperity signal; (b) means for determining a thermal asperity event information that characterizes the received thermal asperity signal; (c) means for storing the thermal asperity event information; and (d) means for determining erasure locations for the interleaved data bytes from the stored thermal asperity event information.

The apparatus and method of the present invention advantageously employs thermal asperity signals to generate and record thermal asperity event information including a starting interleave number, a starting interleave address, and a length of the signal. In addition, the present invention accesses the stored thermal asperity event information to generate interleave erasure locations for associated data bytes being decoded on-the-fly. The use of the thermal asperity signal to generate interleave erasure locations as described herein allows efficient processing of interleaved sector data bytes by utilizing the conventional thermal asperity signals. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

Prior Art

FIG. 2B shows a more detailed block diagram of the exemplary read channel circuitry.

DETAILED DESCRIPTION OF THE PREFERRED EMBODIMENTS

An invention is described for an apparatus and method for generating erasure locations from a thermal asperity signal that indicates an error burst in an interleaved data sector. It will be obvious, however, to one skilled in the art, that the present invention may be practiced without some or all of these specific details. In other instances, well known process operations have not been described in detail in order not to unnecessarily obscure the present invention.

Figure 1:
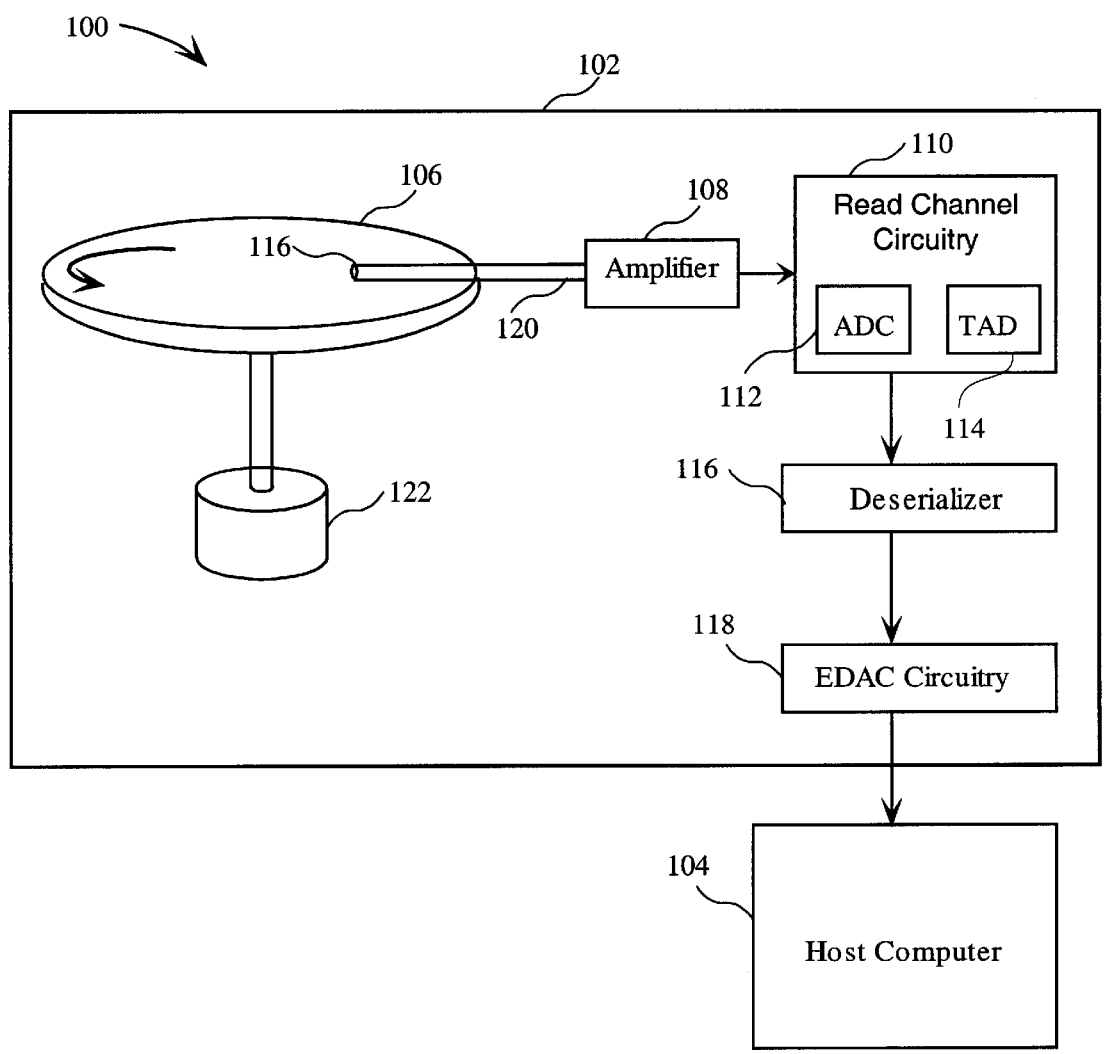
FIG. 1 illustrates a block diagram of a conventional computer system including a hard disk drive and a host computer.
Figure 2A:
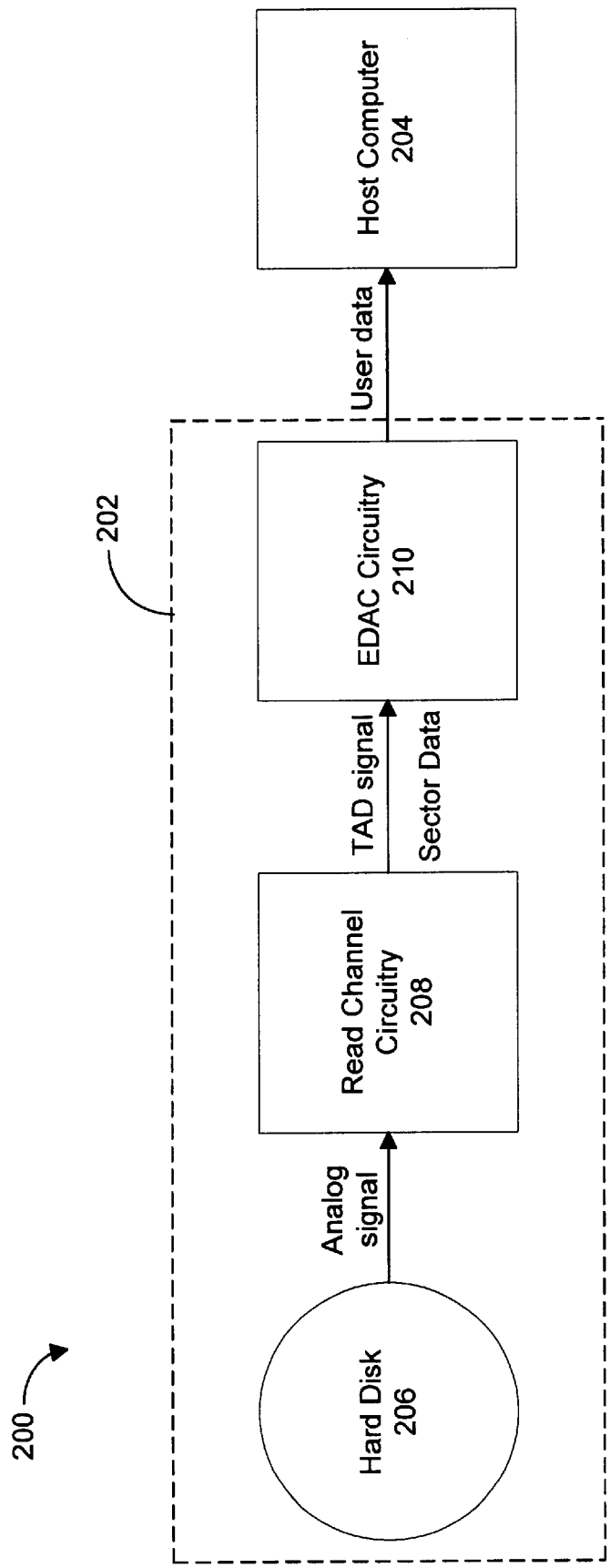
FIG. 2A illustrates a block diagram of an exemplary computer system that includes a host computer and a hard disk drive in accordance with one embodiment of the present invention.

FIG. 2A illustrates a block diagram of an exemplary computer system 200 that includes a host computer 204 and a hard disk drive 202 in accordance with one embodiment of the present invention. The hard disk drive 202 includes a hard disk 206, a read channel circuitry 208, and an EDAC circuitry 210. The hard disk 206 serves to sequentially store data in a plurality of sectors, each which is typically 512 bytes of user data and a plurality of ECC bytes. For example, a recorded sector may include 41 ECC bytes appended to a set of user data bytes for error correction.

The read channel circuitry 208 is coupled to the hard disk 206 to receive the sector data in the form of an analog read signal by means of a read/write head. The read channel circuitry 208 converts the analog read signal into digital sector data. In addition, the read channel circuitry 208 generates a thermal asperity detect (TAD) signal when the read signal indicates a thermal asperity event.

The EDAC circuitry 210 is coupled to receive the TAD signal and the sector data from the read channel circuitry 208. The EDAC circuitry 210 uses the TAD signal to perform error detection and correction on the received sector data. After the error detection and correction, the EDAC circuitry 210 outputs user data to the host computer 204.

FIG. 2B shows a more detailed block diagram of the exemplary read channel circuitry 208. The read channel circuitry 208 includes an analog-to-digital converter (ADC) 212 and a thermal asperity detector 214. The ADC 212 receives the analog read signal and converts the analog signal into digital sector data. The ADC 212 converts the analog data signal into a sequence of data bytes that form a data sector. For example, for a data sector having 512 bytes, the ADC 212 converts the analog signal representing the data sector into 512 sequential digital bytes from the first byte B0 through the last byte B511. The read channel circuitry 208 may include well-known serial-to-parallel converters and filters to generate the sector data bytes.

The read channel circuitry 208 includes an ADC 212 and a TA detector 214. The ADC 212 converts the analog read signal into digital sector data for transmission to the EDAC circuitry 210. In one embodiment, the TA detector 214 is coupled to receive the read signal via the ADC 212 and monitors the read signal to detect TA events. Alternatively, the TA detector 214 may receive the read signal in parallel to the ADC 212.

Since a TA event typically cause a sudden DC voltage shift in the read signal, which then decays exponentially, the TA detector 214 tracks the DC voltage shift in the read signal to detect such an event. In a preferred embodiment, the TA detector 214 may include a threshold comparator to compare the read signal voltage to a predetermined threshold voltage. When the read signal crosses the comparator threshold value, the TA detector 214 asserts a TA detect (TAD) signal for transmission to the EDAC circuitry 210. For example, if the read signal voltage is larger than the threshold voltage, the TA detector 214 generates a TAD signal to indicate detection of a TAD event.

Figure 2C:
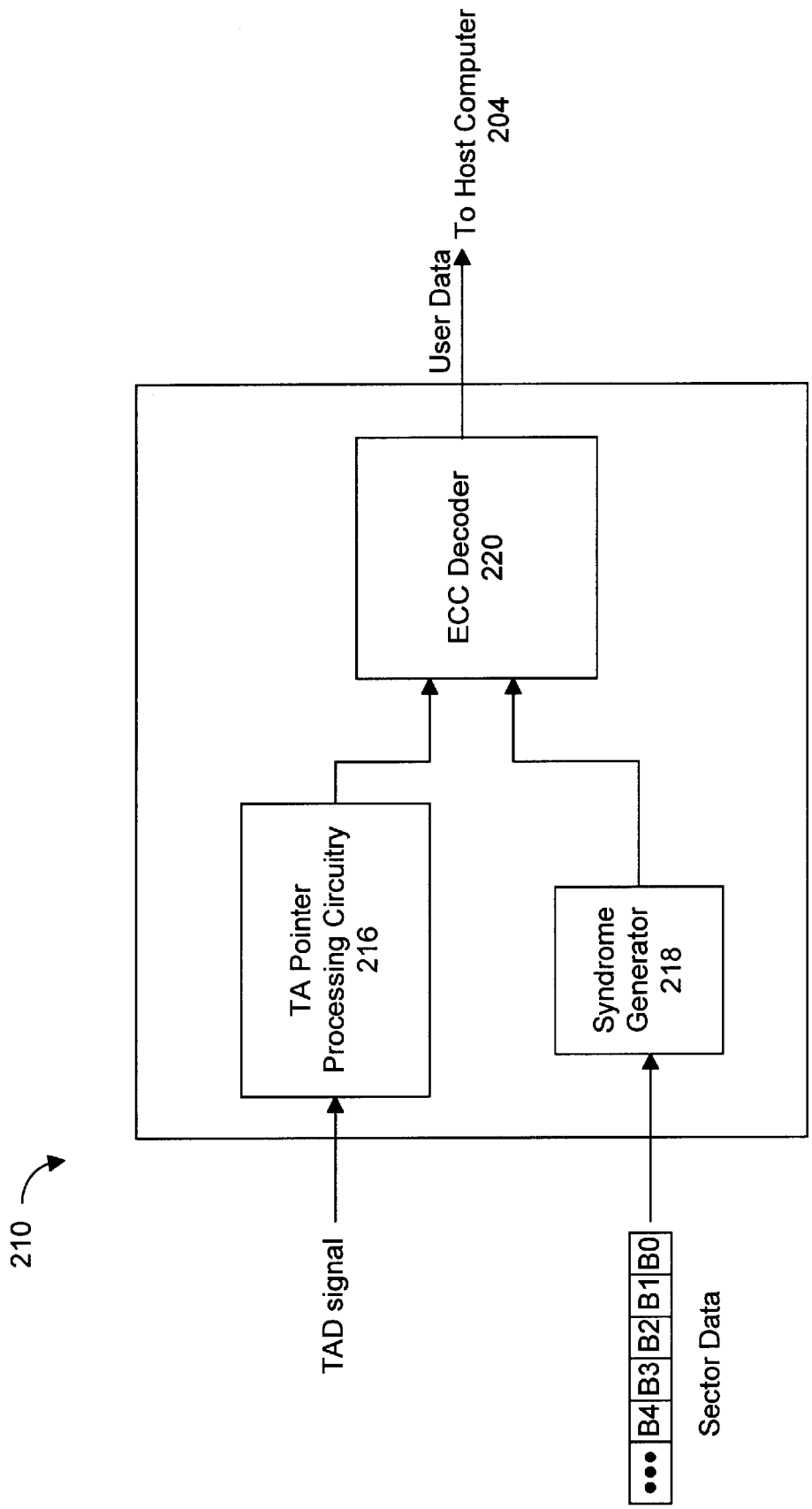
FIG. 2C illustrates an exemplary EDAC circuitry for detecting and correcting errors in the received sector data in accordance with one embodiment of the present invention.

FIG. 2C illustrates an exemplary EDAC circuitry 210 for detecting and correcting errors in the received sector data in accordance with one embodiment of the present invention. The EDAC circuitry 210 includes a TA pointer processing circuitry 216, a syndrome generator, and an ECC decoder 220. The TA pointer processing 216 circuitry receives the TAD signal from the read channel circuitry 208 and generates erasure locations for input into the ECC decoder 220. On the other hand, the syndrome generator 218 receives the sector data from the read channel circuitry to generate partial syndromes. The syndrome generator 218 transmits the generated syndromes and the sector data to the ECC decoder 220.

The ECC decoder 220 is coupled to the TA pointer processing circuitry 216 and the syndrome generator 218 to receive the erasure locations and the partial syndromes. Using the partial syndromes and the erasure locations, the ECC decoder 220 performs error detection and correction on the received sector data bytes, one byte at a time. Specifically, the EDAC circuitry 210 uses the TAD signal as an erasure, which is an error with known error locations but unknown error values. In particular, the TAD signal is associated with a specified byte location in the user data and is a pointer to the byte location in the sector data.

In accordance with preferred embodiments of the present invention, the EDAC circuitry 210 may be configured to process interleaved sector data. As is well known in the art, interleaving is a conventional technique used to disperse data for each codeword over a larger area of media to spread error bursts over multiple codewords. Since interleaving distributes a burst error over multiple codewords, the interleaving technique allows efficient correction of the burst error.

Figure 2D:
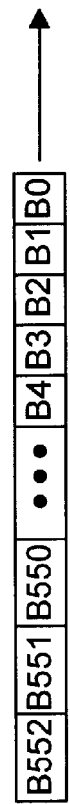
FIG. 2D shows an exemplary de-interleaving structure of a 553-byte sector in a 3-way interleave configuration.

FIG. 2D shows an exemplary de-interleaving structure for a 553-byte sector in a 3-way interleave configuration. The sector typically includes 512 bytes of user data and 41 ECC bytes. The EDAC circuitry 210 receives the sector bytes sequentially from the first byte B0 through the last byte B552. As will be described in more detail below, the EDAC circuitry 210 receives each of the sector data bytes sequentially and assigns a binary starting interleave number s (e.g., 0, 1, or 2 in 3-way interleave) and an interleave address E from 0 to 184 (e.g., $\alpha^0$ to $\alpha^{184}$). The EDAC circuitry 210 uses the TAD signal in such an interleave scheme to facilitate on-the-fly processing of sector data. Even though a three-way interleave configuration is described herein, those skilled in the art will recognize that the EDAC circuitry 210 may implement any interleave configuration greater than or equal to 2 (e.g., 2, 3, 4, 5, etc.).

Figure 3:
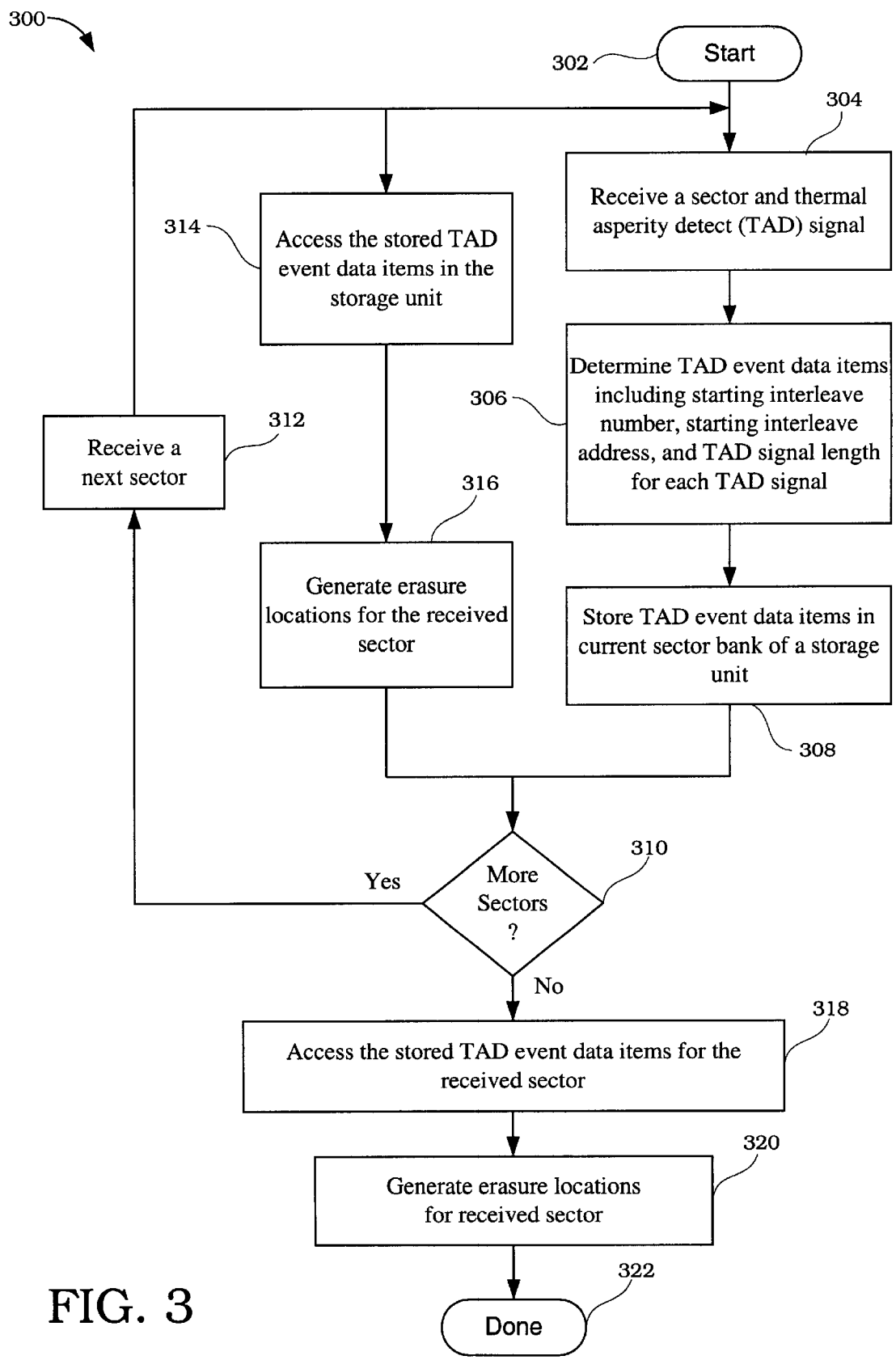
FIG. 3 shows a flow diagram of a method performed by the EDAC circuitry in generating proper erasure locations for the received TAD signal.

FIG. 3 shows a flow diagram of a method 300 performed by the EDAC circuitry 210 in generating proper erasure locations for the received TAD signal. The method 300 starts in operation 302. In operation 304, the EDAC circuitry 210 receives a sector and a TAD signal. The EDAC circuitry 210 then determines a plurality of TAD event data items, each of which includes a starting interleave number, a starting interleave address, and a length (i.e., duration) of the TAD signal in operation 306. As a TAD event data is determined, the EDAC circuitry 210 stores the TAD event data item for the received sector in operation 308, in a storage unit. Preferably, the TAD event data items are stored in a first sector bank of a FIFO buffer in a FIFO manner.

After receiving and generating TAD event data items, the EDAC circuitry 210, in operation 310, then determines whether more sectors need to be received and processed. If so, the method 300 proceeds to operation 312 to simultaneously receive the next sector while determining erasure locations from the TAD event data items for the received sector. Specifically, the method 300 proceeds to operation 314 and 316 to access the stored TAD event data items and generate erasure locations associated with the previously received sector. The method 300 also proceeds back to operations 304, 306, and 308 to receive a next sector to determine and store the associated TAD event data items. In this fashion, the EDAC circuitry 210 performs on-the-fly error detection and correction by simultaneously generating erasure locations associated with a received sector while receiving a next sector.

On the other hand, when no more sector is to be received, the method 300 proceeds to operation 318, where the EDAC circuitry 210 accesses the stored TAD event data items associated with the received sector. The EDAC circuitry 210 then generates erasure locations associated with the received sector in operation 320. The method 300 terminates in operation 322.

Figure 4:
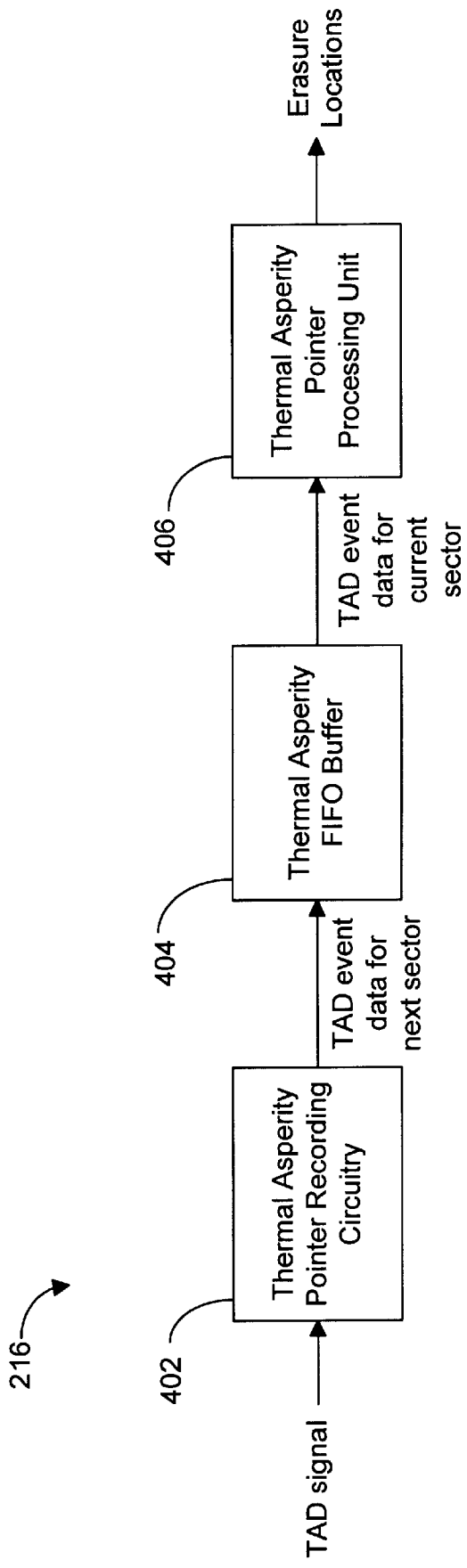
FIG. 4 shows a more detailed block diagram of the TA pointer processing circuitry in accordance with one embodiment of the present invention.

FIG. 4 shows a more detailed block diagram of the TA pointer processing circuitry 216 in accordance with one embodiment of the present invention. The TA pointer processing circuitry 216 includes a TA pointer recording circuitry 402, a TA first-in-first-out (FIFO) buffer 404, and a TA pointer processing unit 406. The TA pointer recording circuitry 402 receives the TAD signal and generates a TAD event data item for a sector associated with the TAD signal. As will be described in more detail below, each of the TAD event data item may include a TAD length, a starting interleave address E, and a starting interleave number s.

The TA FIFO 404 is coupled to receive the TAD event data items from the TA pointer recording circuitry 402 for storage in a FIFO manner. The TA FIFO buffer 404 may be arranged to store up to N TAD event data items per sector. Preferably, the TA FIFO buffer 404 stores up to 4 TAD event data items per sector. The TA FIFO buffer 404 is arranged to have M banks for storing data items of M sectors. Each of the M bank is capable of storing up to N TAD event data items.

The TA pointer processing circuitry 216 generates erasure locations for sequential sectors on-the-fly by processing a received sector data items while receiving a next sector data items. In the preferred embodiment, the TA FIFO buffer 404 includes 2 banks for storing TAD event data items of two sequential sectors. In this dual bank configuration, the TA FIFO buffer 404 is configured to provide stored TAD event data items for a current sector to be processed to the TA pointer processing unit 406 for generating erasure locations. In the meantime, the TA FIFO buffer 404 also receives and stores TAD event data items for a next sector from the TA pointer recording circuitry 402.

For example, the TA FIFO buffer 404 receives and stores TAD event data items for a first sector B0. Then, while the TA FIFO buffer 404 receives and stores TAD event data items for a second sector B1, the TA FIFO buffer 404 provides the TAD event data items for the first sector B0 to the TA pointer processing unit 406. In this manner, the TA pointer processing circuitry 216 generates erasure locations for the data sectors on-the-fly.

The TA pointer processing unit 406 is coupled to the TA FIFO buffer 404 to access the TAD event data items for the current sector. The TA pointer processing unit 406 then generates erasure locations from the TAD event data items.

Figure 5A:
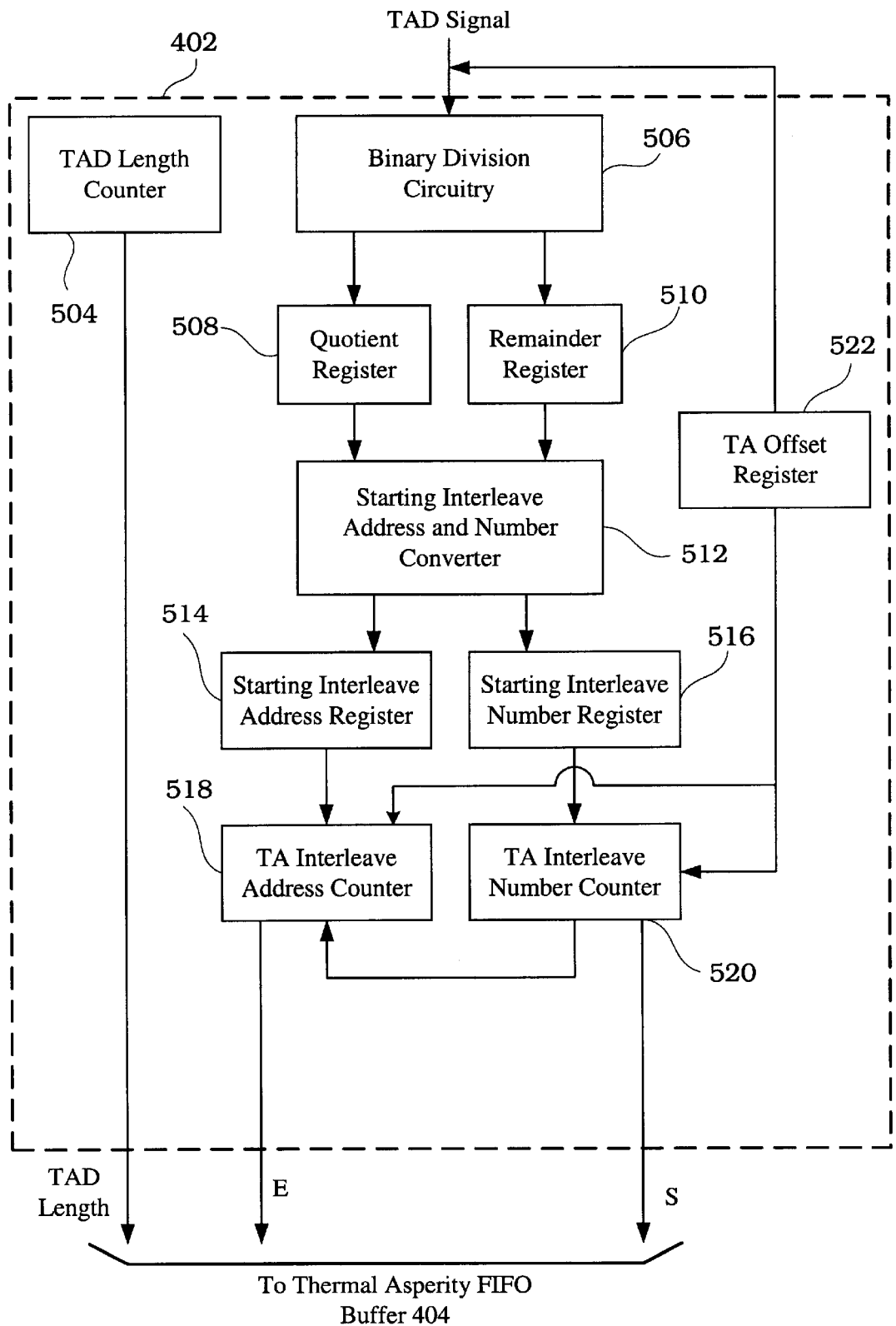
FIG. 5A illustrates a more detailed block diagram of the TA pointer recording circuitry in accordance with one embodiment of the present invention.

FIG. 5A illustrates a more detailed block diagram of the TA pointer recording circuitry 402 in accordance with one embodiment of the present invention. The TA pointer recording circuitry 402 receives a TAD signal, a sector size, and a total number of interleaves, which may be received from the EDAC circuitry 210. The TA pointer recording circuitry 402 includes a TAD length counter 504, which receives the TAD signal and determines the duration of the signal for output. Preferably, the TAD length counter 504 is implemented as a 6-bit counter that counts the duration of the TAD signal.

The TA pointer recording circuitry 402 also includes a starting interleave address and number generator for generating a starting interleave address and an interleave number associated with the received TAD signal. The interleave address and number generator receives the sector size as a dividend and the total number of interleaves as a divisor and performs a binary division to generate the starting interleave address and the interleave address for the received TAD signal.

Specifically, the starting interleave address and number generator includes a binary division circuitry 506, a quotient register 508, a remainder register 510, a starting interleave address and number converter 512, a starting interleave address register 514, a starting interleave number register 516, a TA interleave address counter 518, a TA interleave number counter 520, and a TA offset register 522. The binary division circuitry 506 receives the sector size as the dividend and the number of interleaves as the divisor and performs binary division on the dividend using the divisor, thereby producing a quotient and remainder. The binary division circuitry 506 then transmits the quotient and remainder to the quotient register 508 and the remainder register 510, respectively, for storage. In one embodiment, the quotient may be converted into its finite field representation (e.g., $\alpha^0$, $\alpha^1$, $\alpha^2$, ..., $\alpha^{184}$) using well known finite field anti-log operations. For example, quotients with values of 0, 1, and 2 may be converted to a finite field representation of $\alpha^0$, $\alpha^1$, and $\alpha^2$, respectively.

After quotient and remainder have been determined, the starting interleave address and number converter 512 determines starting interleave address and starting interleave number for first data byte of a sector (e.g., B552). The starting interleave address and number converter 512 is coupled to the quotient and remainder registers 508 and 510 to receive the quotient and the remainder. If the remainder is 0, the converter 512 determines the starting interleave address of the most significant byte (e.g., B552) within a sector to be the quotient multiplied by $\alpha^{-1}$. On the other hand, if the remainder is not equal to 0, the converter 512 outputs the quotient to be the starting interleave address of the most significant byte.

To determine a starting interleave number, the starting interleave address and number converter 512 determines whether the remainder is equal to 0. If so, the starting interleave number of the most significant byte is set to the interleaving degree minus 1. If not, the starting interleave number of the most significant byte is set to the remainder minus 1.

After determining the starting interleave address and number, the converter 512 transmits the starting interleave address and the starting interleave number to the starting interleave address register 514 and starting interleave number register 516 for storage. The TA interleave address counter 518 and the TA interleave number counter 520 are coupled to the registers 514 and 516, respectively, to receive the starting interleave address and the starting interleave number. The starting interleave address and number thus initialize the TA interleave address counter 518 and TA interleave number counter 520 at the beginning of every sector.

The TA interleave address counter 518 is preferably a well known Galois field counter, which generates interleave addresses of starting TA events in finite field representation (e.g., $\alpha^1$, $\alpha^2$, etc.). On the other hand, the TA interleave number counter 520 keeps track of the interleave number of every data byte within a sector. In one embodiment, the TA interleave number counter 520 is a 3-bit binary counter and is initialized with the starting interleave number from the starting interleave number register 516 at the beginning of each sector. The counter 520 counts down on every data byte. When the count reaches 0 and new data byte is received, the counter 520 wraps around to its maximum interleave number (i.e., interleave degree minus one). When the counter 520 wraps around, the counter also feeds a wrap around signal to the TA interleave address counter 518. The wrap around signal triggers the TA interleave address counter 518 to decrement to the next field element on the next clock cycle.

The TA offset register 522 is used to control the delay of the TAD signal into the TA pointer recording circuitry 402. For example, if TA starting offset is not programmed to 0, counters 518 and 520 may behave differently after initialization. Accordingly, the TA offset register 522 may be programmed to an offset value to synchronize the counters 518 and 520 with the TAD signal by means of an offset value. If TA bytes are early relative to the TAD signal, for example, an offset value in the offset register causes the counters 518 and 520 to ignore the first few bytes before synchronizing with true TA byte locations. On the other hand, if TA bytes are late relative to TAD signal, the offset register 522 may delay the TAD signal by a specified number of cycles in response to an offset so that the TAD signal is aligned with true TA byte locations.

In one embodiment, the TAD length is written to the TA FIFO buffer 404 after writing the TA starting interleave address and number. Specifically, when the TAD signal is asserted, the TA pointer recording circuitry 402 generates the starting interleave address and the starting interleave number in the TA interleave address counter 518 and TA interleave number counter 520, respectively. On the next cycle after the leading edge of the TAD signal, the TA pointer recording circuitry 402 writes the starting interleave address and number to the TA FIFO buffer 404. However, since the duration of TA bursts is not available when the leading edge of the TAD signal is detected, the TAD length counter 504 keeps track of the duration of TA events. In one embodiment, the 6-bit TAD length counter 504 is capable of recording a maximum TAD signal length of 63 bytes. On the next cycle after the trailing edge of the TAD signal, the length count in the TAD length counter 504 is written to the FIFO buffer 404. In an alternative embodiment, the TAD length along with the starting TA interleave address and number may be written to the FIFO 404 simultaneously when the TAD length becomes available.

Figure 5B:
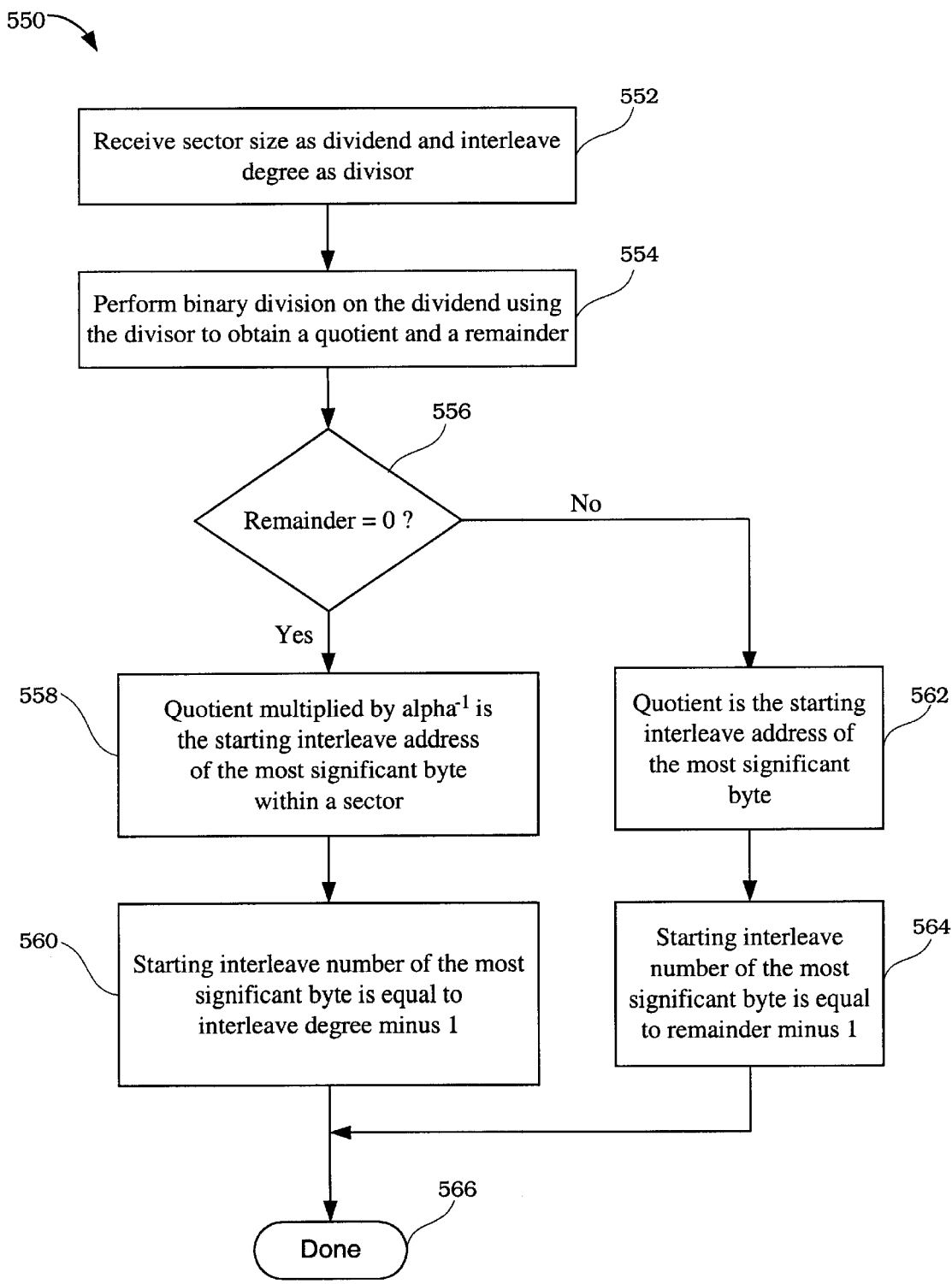
FIG. 5B illustrates, in accordance with another embodiment of the present invention, a method performed by the starting interleave address and number generator for generating the starting interleave address and number associated with a received TAD signal.

FIG. 5B illustrates, in accordance with another embodiment of the present invention, a method 550 performed by the starting interleave address and number generator for generating the starting interleave address and number associated with a received TAD signal. The starting interleave address and number generator receives a sector size as a dividend and an interleave degree as a divisor in operation 552. Then, in operation 554, a binary division is performed on the dividend using the divisor to obtain a quotient and a remainder. The quotient is converted to Galois field representation by an anti-log operation.

In operation 556, the interleave address and number generator determines whether the remainder is equal to 0. If the remainder is equal to 0, the method 550 proceeds to operations 558 and 560. In operation 558, the starting interleave address of the most significant byte of the sector is set to the product of the quotient and $\alpha^{-1}$. In operation 560, the starting interleave number of the most significant byte is set to the interleave degree minus 1.

On the other hand, if the remainder is not equal to 0, the method proceeds to operations 562 and 564. In operation 562, the quotient is determined to be the starting interleave address of the most significant byte in the sector. Then, in operation 564, the starting interleave number of the most significant byte is set equal to remainder minus 1. The method 550 then terminates in operation 566.

Figure 6:
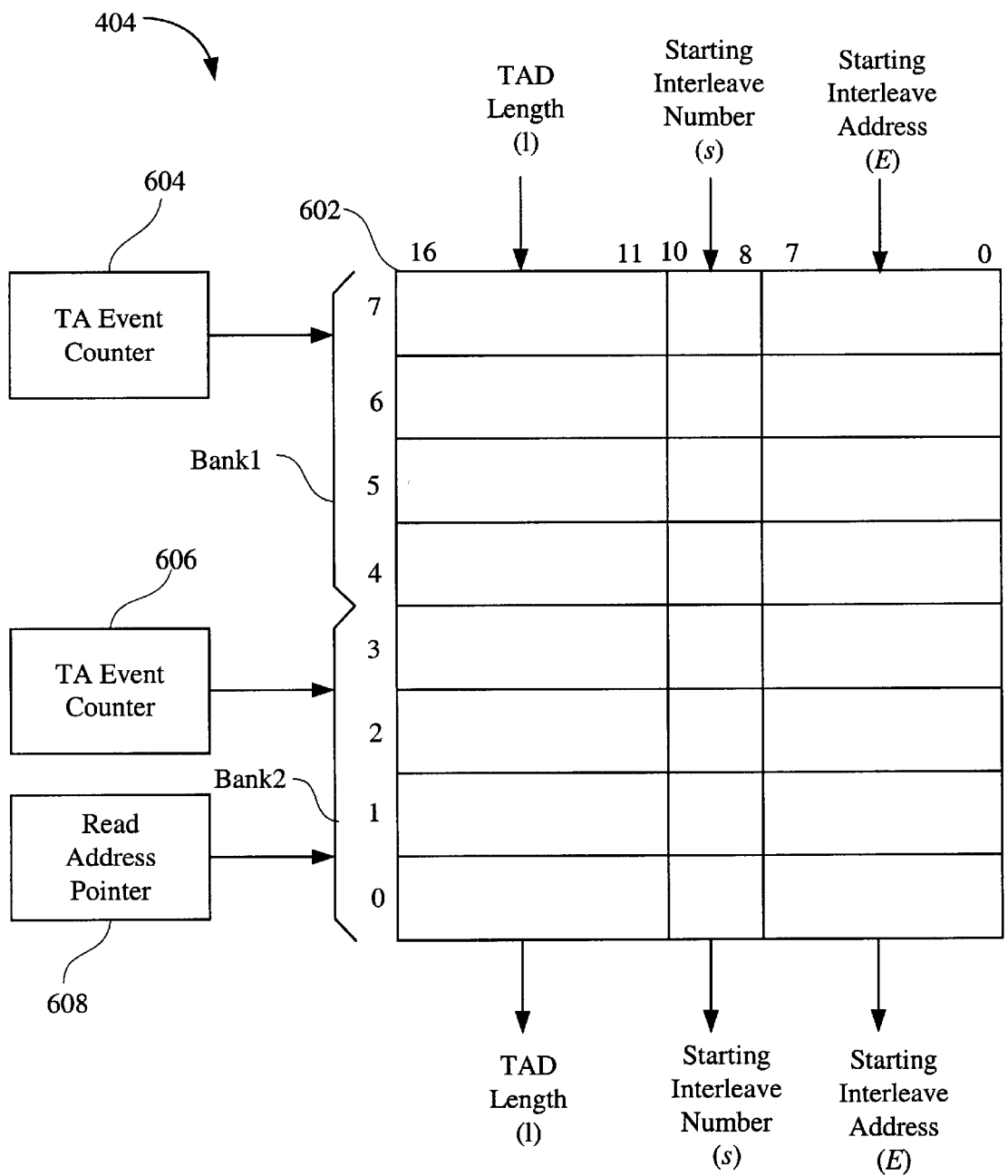
FIG. 6 shows a more detailed block diagram of the TA FIFO buffer for storing TA event data items of a next sector while providing TA event data items of the current sector for error correction in accordance with one embodiment of the present invention.

FIG. 6 shows a more detailed block diagram of the TA FIFO buffer 404 for storing TA event data items of a next sector while providing TA event data items of the current sector for error correction in accordance with one embodiment of the present invention. The TA FIFO buffer 404 is coupled to the TA pointer recording circuitry 402 to receive the TAD event data items for the next sector, which is a sector that has not been received in its entirety yet.

The TA FIFO buffer 404 includes a buffer 602 for storing TAD event data items. The TA FIFO buffer 404 may receive and store up to N TA event data items per sector. In the preferred embodiment, the buffer 602 is configured in a dual bank arrangement including Bank1 and Bank2. Each bank includes preferably up to four (N=4) FIFO entries. Each FIFO entry includes three fields for storing the starting interleave address, starting interleave number and the TAD signal length. The starting interleave address field is 8 bits wide and occupies locations [7:0] in the FIFO entry. The starting interleave number field is 3 bits in length corresponding to locations [10:8] in the FIFO entry. The TAD signal length is 6 bits wide and is associated with bit locations [16:11] in the FIFO entry. Hence, the size of each bank is 4×17 and the size of the buffer 602 is 8×17. Even though such a FIFO buffer configuration is illustrated herein, any suitable buffer arrangement for storing TAD event data items may also be employed. For example, the buffer 602 may include more than two banks with varying number of entries per bank.

In this buffer configuration, each bank is used to store all TAD event data items for a sector. The dual bank arrangement allows on-the-fly processing of TA event data items. For example, while the buffer 602 receives and stores TAD event data items for the next sector, the buffer 602 also provides TAD event data items for the previously received current sector. That is, when one bank receives TAD event data items for the next sector that is being received, the other bank provides the stored TAD event data items for the current sector that is being processed. In one embodiment, the buffer is configured in a single-port read and single-port write register file structure.

The TA FIFO buffer includes a pair of TA event counters 604 and 606 to keep track of the number of TAD event data items stored in the buffer 602 for the current and next sectors. For example, TA event counter 604 is associated with Bank1 and keeps track of the number of TAD event data items in Bank1. Similarly, TA event counter 606 is associated with Bank2 and keeps track of the number of TAD event data items in Bank2.

To keep track of the number of TAD event data items in the associated banks, the counters 604 and 606 are coupled to receive read/write enable (R/W) signals. A write signal indicating a recording of a TA event data item for a next sector increments the associated counter. On the other hand, a read signal indicating a reading of a TA event data item for a current sector decrements the associated counter. For example, the counter 604 counts the number of TAD events for the next sector being received while the counter 606 counts the number of TAD events remaining in the current sector being processed by the ECC decoder 220. If more than four TA events are detected in a sector, the counter associated with the next sector remains at 4 and the TA pointer recording circuitry 402 may generate a status flag indicating an overflow condition.

In one embodiment, the TA pointer recording circuitry 402 controls the write addresses of the TA FIFO buffer 404 so that the two banks are written in a ping-pong fashion for alternate sectors. The R/W pointers switch banks at the beginning of every sector to implement the ping-pong scheme.

The FIFO buffer 404 also includes a read address pointer register 608 to store a read address pointer to an entry (i.e., TAD event data item) to be read next for decoding. When the entry has been read, the read address pointer is updated to point to the next entry in the bank. In this manner, the read address pointer keeps track of the next entry to be read and processed. Each bank may have its own read address pointer register to keep track of the next entry to be read. In the alternative, the read address pointer register 608 may be used with the bank that is currently being read and processed.

Figure 7A:
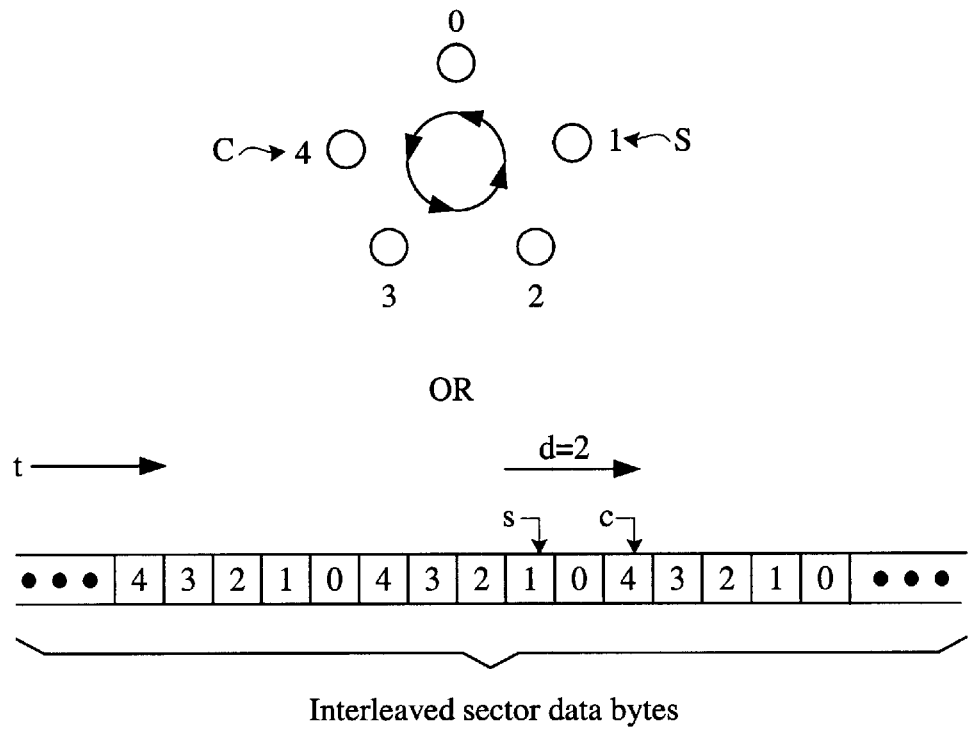
FIG. 7A shows an the assignment of each incoming data byte with an interleave number in an exemplary 5-way interleave configuration.

The TA processing unit 406 reads the TAD event data items from the TA FIFO buffer 404 and extracts information for the current interleave of the data byte that the ECC decoder 220 is currently processing. Specifically, the TA processing unit 406 receives the starting interleave location, starting interleave number, and TAD length and generates consecutive erasure locations for a particular interleave that the ECC decoder 220 is working on. For example, FIG. 7A shows an the assignment of each incoming data byte with an interleave number in an exemplary 5-way interleave configuration. Each data byte is labeled with an interleave number.

With continuing reference to FIG. 7A, given a starting interleave number s, current interleave number c, total number of interleaves i, and TA length l spanning multiple interleaves, the TA processing unit 406 generates consecutive erasure locations for current interleave. The distance d between s and c is equal to [(s−c) mod i]. For example, if s=1, c=4, and i=5, the distance in bytes between s and c is [(1−4) mod 5], which is 2.

Figure 7B:
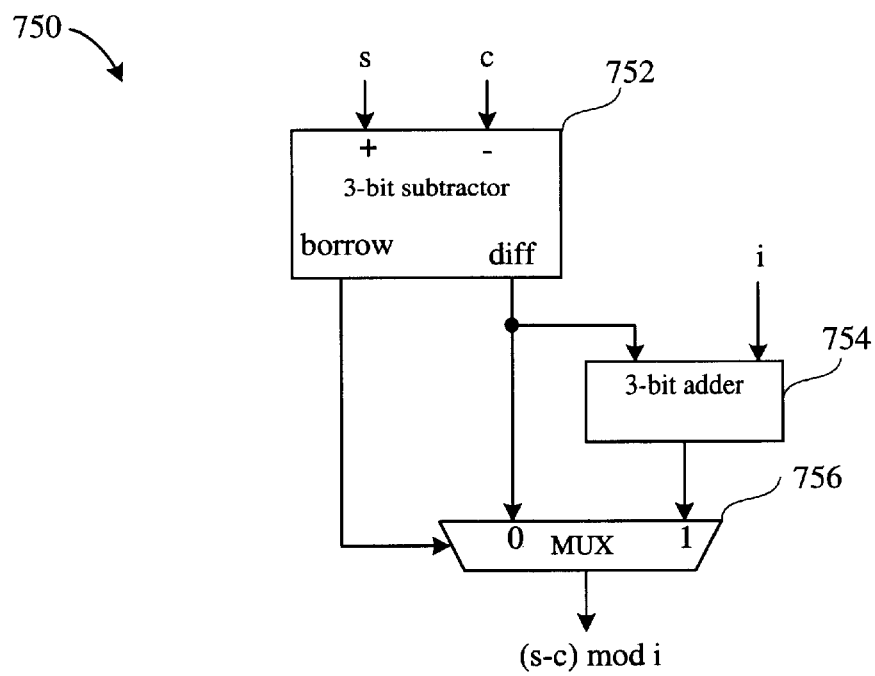
FIG. 7B illustrates a block diagram of an exemplary distance generator that implements [(s-c) mod i] for generating distance d between a starting interleave number and a current interleave number in accordance with one embodiment of the present invention.

FIG. 7B illustrates a block diagram of an exemplary distance generator 750 that implements [(s−c) mod i] for generating distance d between a starting interleave number and a current interleave number in accordance with one embodiment of the present invention. The distance generator 750 includes a 3-bit subtractor 752, a 3-bit adder 754, and a multiplexer 756. The subtractor 752 receives s and c to generate a borrow-bit and a difference. The adder 754 receives the difference and i total number of interleaves to produce a sum. The sum and the difference are then fed to the multiplexer 756 as inputs. The multiplexer uses the borrow bit to select one of the inputs as the distance d.

Figure 7C:
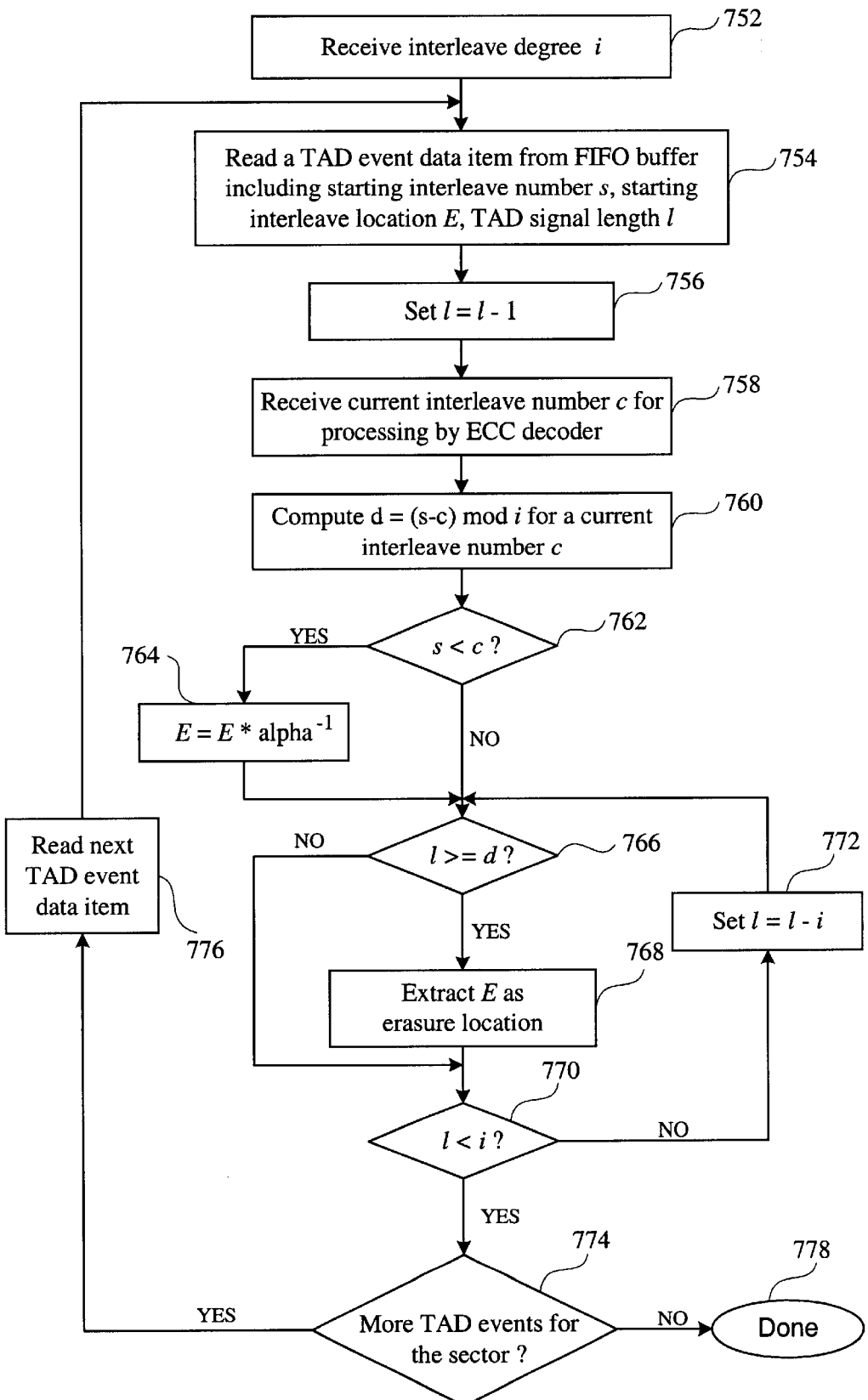
FIG. 7C shows a flow chart of operations performed by the TA pointer processing unit 406 to extract erasure from TAD event data items for a current interleave number being processed by the ECC decoder 220.

FIG. 7C shows a flow chart of a method performed by the TA pointer processing unit 406 for extracting erasure from TAD event data items for a current interleave number being processed by the ECC decoder 220. The ECC decoder 220 decodes sector data sequentially one interleave at a time. For example, in a 5-way interleave configuration, the ECC decoder 220 may process sector data bytes in the interleave order number of 4, 3, 2, 1, and 0.

In operation 752, the TA pointer processing unit 406 receives the total number of interleaves i (i.e., interleave degree). The TA pointer processing unit 406 then reads a TAD event data item from the FIFO buffer 404 in operation 754. The TAD event data item includes a starting interleave number s, a starting interleave location E (e.g., $\alpha^k$), and TAD signal length l.

The TA pointer processing unit 406 then determines whether an erasure location is present within the range defined by s and l, and if so, whether more than one erasure locations are present. Specifically, in operation 756, l is set to (l−1). Then in operation 758, a current interleave number c that is to be processed by the ECC decoder is received. The TA pointer processing unit 406, in operation 760, computes a distance d between the current interleave number being processed by the ECC decoder and the starting interleave number s. Preferably, the distance d is computed in accordance with equation d=[(s−c) mod i]. In operation 762, it is determined if s is less than c. If so, E is updated to be $E*\alpha^{-1}$ (e.g., $\alpha^{k-1}$) in operation 764. If not, E is not updated.

In either event, the TA pointer processing unit 406 proceeds to operation 766 to determine if l is greater than or equal to d. If yes, E is extracted as an erasure location in operation 768 and proceeds to operation 770. If l is not greater than or equal to d, the method bypasses operation 768 and proceeds directly to operation 770. In operation 770, it is determined whether l is less than i. If l is not less than i, the TA pointer processing unit 406 proceeds to operation 772 to determine another erasure pointer by setting l to (l−i) in operation 772 and proceeding back to operation 766.

On the other hand, if l is less than i, the TA pointer processing unit 406 proceeds to operation 774 to determine whether more TAD event data items for the sector remain in the FIFO buffer 404. If yes, the TA pointer processing unit 406 proceeds to operations 776 and 754 to read next TAD event data item. If not, the method terminates in operation 778.

By way of example, Table 1 shows three FIFO buffer entries to illustrate the operation of the flowchart depicted in FIG. 7C.

TABLE 1

| Read Address Pointer | Starting Interleave Address (E) | Starting Interleave Number (s) | TAD signal length (l) |
| --- | --- | --- | --- |
| 0 | $\alpha^i$ | 1 | 5 |
| 1 | $\alpha^j$ | 2 | 3 |
| 2 | $\alpha^k$ | 4 | 9 |

The three FIFO entries corresponding to three error bursts are read and processed sequentially with the assumption of interleave degree i of 5 and current interleave number c of 3. In processing the first entry, length l, initially 5, is first updated to 4 by subtracting 1 from 5. The distance d between s and c is (1−3) mod 5, which is 3. Since l is greater than or equal to d, one erasure is found in the first TA burst. Because s is less than c, the erasure location in this case is $\alpha^{i-1}$.

In processing the second entry corresponding to the second error burst, length l with initial value of 3 is modified to become 2 by subtracting 1 from 3. The distance d between s and c is (2−3) mod 5, which yields 4. Because l is now less than 4 (i.e., d) and l is less than i, no erasure is determined to exist for current interleave in the second TA burst.

The processing of the third entry corresponding to the third error burst begins by modifying the length l to 8 by subtracting 1 from its initial value of 9. The distance d between s and c is (4−3) mod 5, which yields 1. Since l of 8 is greater than d, the first erasure is found to be $\alpha^k$. Then, the length l is modified to be 3 by subtracting the value of i (i.e., 5) from the previous value of l (i.e., 8). Since the new l is now less than i, at most one erasure is left. Because l is greater than or equal to d, the second erasure is determined to be $\alpha^{k-}$. In this example, a total of two erasures are extracted.

Figure 8:
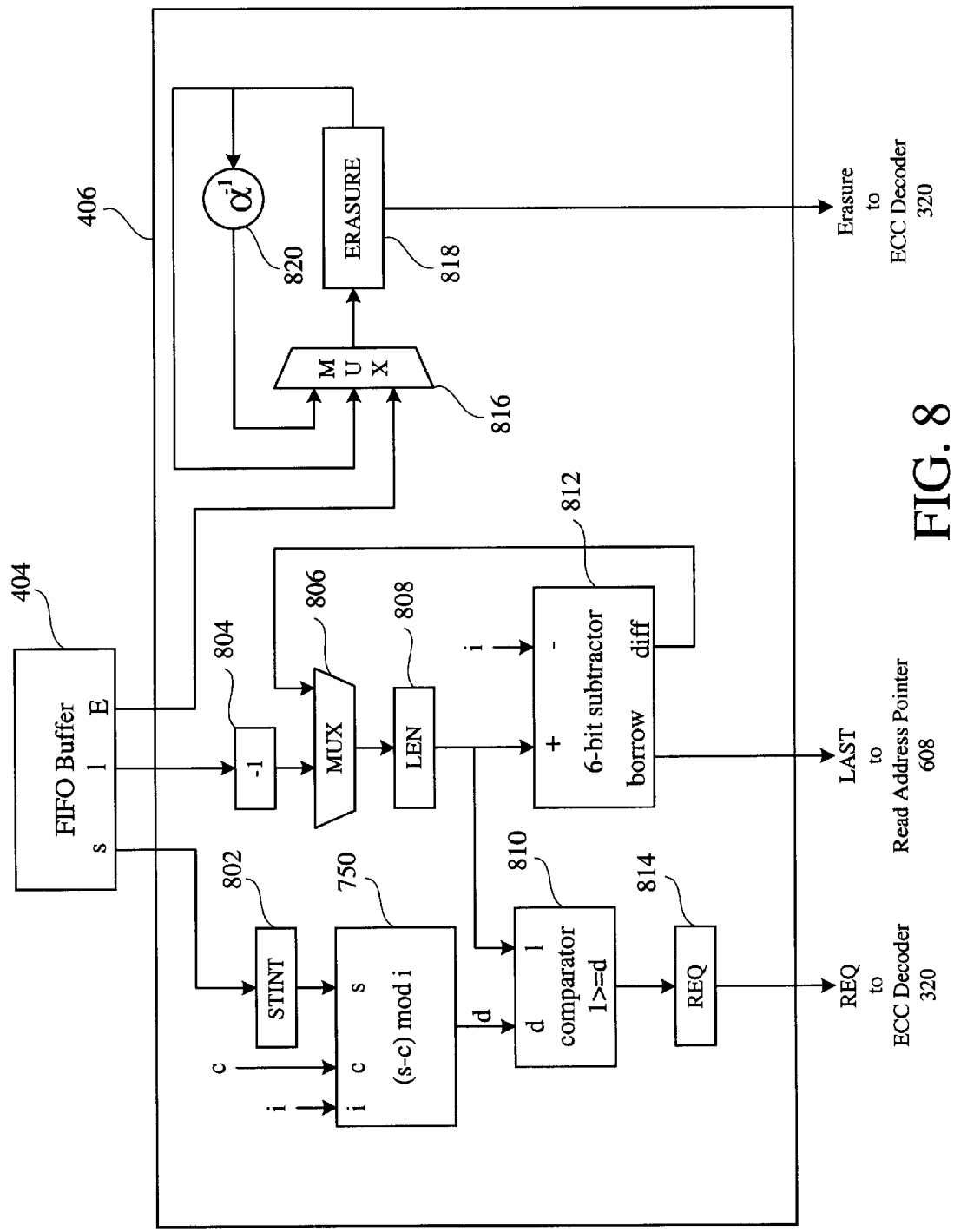
FIG. 8 shows, in accordance with one embodiment of the present invention, a more detailed block diagram of the TA pointer processing unit coupled to receive TAD event data items from the FIFO buffer.

FIG. 8 shows, in accordance with one embodiment of the present invention, a more detailed block diagram of the TA pointer processing unit 406 coupled to receive TAD event data items from the FIFO buffer 404. The TA pointer processing unit 406 is configured to receive from the coupled FIFO buffer 404 a starting interleave number s, a TAD signal length l, and a starting interleave address E. When a TAD event data item is read from the FIFO buffer 404, the starting interleave number s is stored in a STINT register 802. The TAD signal length l fed to a subtractor 804, which subtracts 1 from l and stores a modified l into LEN register 808 through a multiplexer 806. The starting interleave address E is stored in an ERASURE register 818 through a multiplexer 816.

The TA pointer processing unit 406 includes the distance generator 750, which is configured to receive the starting interleave number s stored in STINT register 802, interleave degree i, and current interleave number c from the ECC decoder 220. The distance generator 750 determines a distance d between the starting interleave number s and the current interleave number c by implementing, preferably, the [(s−c) mod i] algorithm discussed above.

A comparator 810 is coupled to the distance generator 750 and LEN register 808 to receive the distance d and modified length l. The comparator 810 determines whether l is greater than or equal to d. If so, the comparator 810 outputs a REQ signal, which indicates that the erasure location stored in ERASURE register 818 is a correct value and can thus be released to the ECC decoder 220. A REQ register 814 is coupled to the comparator 810 to receive the REQ signal for storage and provides the REQ signal to the ECC decoder to indicate the presence of usable erasure location in ERASURE register 818.

The TA pointer processing unit 406 also includes a LAST byte indicator 812 coupled to receive interleave degree i and the modified l stored in the LEN register 808. Preferably, the LAST byte indicator 812 is a 6-bit subtractor, which generates a borrow and a difference as outputs. The borrow corresponds to a LAST signal, which indicates the last byte in the TAD event associated with the TAD event data item. The difference bits represent a modified value of l, i.e., (l−i), and is fed back to the multiplexer 806, which passes on the difference bits representing (l−i) to the LEN register 808 for storage after initially passing (l−1). The LAST signal may be fed to the read address pointer register 608 in the FIFO buffer 404 to trigger the pointer to point to a next TAD event data item in the FIFO buffer 404.

The multiplexer 816 is coupled to the FIFO buffer 404 to receive the starting interleave address E. Initially, the multiplexer 816 passes the starting interleave address E from the FIFO buffer 404 for storage in the ERASURE register 818. The ERASURE register 818 is coupled to feed its content erasure back to the multiplexer 816 via a pair of paths. In one path, a constant multiplier 820 is coupled to receive the erasure stored in the ERASURE register 818 and modify the received erasure by multiplying the erasure by $\alpha^{-1}$. The constant multiplier 820 thus generates an erasure that points to the next erasure location and provides the product to the multiplexer 816 as an input. In the other path, the erasure from the ERASURE register 818 is provided without modification to the multiplexer 816.

If s is less than c, then the multiplexer is configured to select the modified erasure from the constant multiplier 820 for storage as a new erasure in the ERASURE register 818. On the other hand, if s is not less than c, the multiplexer functions to select the unmodified erasure from the ERASURE register 818 for storage in the ERASURE register 818. In this configuration, whenever the REQ signal in the REQ register 814 is asserted (i.e., l>=d), the erasure location in the ERASURE register 818 is extracted by the ECC decoder and subsequently multiplied by $\alpha^{-1}$ so as to point to the next erasure location.

The present invention thus employs thermal asperity signals to generate and record thermal asperity event information including a starting interleave number, a starting interleave address, and a length of the signal. In addition, the present invention accesses the stored thermal asperity event information to generate interleave erasure locations for associated data bytes being decoded on-the-fly. The use of the thermal asperity signal to generate interleave erasure locations as described herein allows efficient processing of interleaved sector data bytes by utilizing the conventional thermal asperity signals.

While the present invention has been described in terms of several preferred embodiments, there are alterations, permutations, and equivalents which fall within the scope of this invention. It should also be noted that there are alternative ways of implementing both the device and device of the present invention. It is therefore intended that the following appended claims be interpreted as including all such alterations, permutations, and equivalents as fall within the true spirit and scope of the present invention.

What is claimed is:

1. A thermal asperity pointer processing apparatus for generating erasure locations from a thermal asperity signal, the thermal asperity signal indicating an error burst in an interleaved data sector, the apparatus comprising:
   a thermal asperity pointer recorder adapted to receive a thermal asperity signal and being configured to generate a thermal asperity event information associated with the thermal asperity signal, the thermal asperity event information including a thermal asperity duration, a starting interleave number, and a starting interleave address of the thermal asperity signal in the interleaved data sector;
   a storage unit configured to receive the thermal asperity event information from the thermal asperity pointer recorder, the storage unit being configured in a single-port read and a single-port write register file structure;
   a counter associated with the storage unit, the counter configured to receive read/write enable signals to track a number of thermal asperity detect items; and
   a thermal asperity pointer processing unit coupled to receive the thermal asperity event information from the storage unit, the thermal asperity pointer processing unit being adapted to generate the erasure locations for interleaves corresponding to the error burst in the data sector.

2. The apparatus as recited in claim 1, wherein the data sector includes a plurality of data bytes that are interleaved in i-way from 0 to (i−1) interleaves, where i is an integer greater than 1, wherein the thermal asperity signal indicates the error burst in a plurality of consecutive data bytes in the data sector.

3. The apparatus as recited in claim 2, wherein the thermal asperity pointer recorder determines the starting interleave number and the starting interleave address by performing a binary division using a total number of data bytes in the data sector as a dividend and i as a divisor.

4. The apparatus as recited in claim 1, wherein the thermal asperity pointer recorder is adapted to generate a plurality of thermal asperity event information from up to N thermal asperity signals, one thermal asperity event information per thermal asperity signal, wherein the storage unit is configured to store up to N thermal asperity event information.

5. The apparatus as recited in claim 4, wherein the apparatus sequentially generates erasure locations for a plurality of interleaved data sectors, wherein the storage unit is configured in a dual bank arrangement to store the thermal asperity event information for a current data sector and a next data sector, wherein when one bank receives the thermal asperity event information for the next data sector, the other bank provides the stored thermal asperity event information for decoding the current data sector.

6. The apparatus as recited in claim 4, wherein the storage unit is a FIFO buffer for storing the thermal asperity event information in a first-in-first out manner.

7. The apparatus as recited in claim 2, wherein the thermal asperity pointer processing unit generates an error location for decoding a current data byte that has a current interleave number.

8. The apparatus as recited in claim 2, wherein the thermal asperity pointer processing unit sequentially generates erasure locations for decoding data bytes corresponding to the error burst.

9. A method for generating erasure locations from a thermal asperity signal that indicates an error burst in a data sector having a plurality of interleaved data bytes, the method comprising:
   a) receiving a thermal asperity signal;
   b) determining a thermal asperity event information that characterizes the received thermal asperity signal;
   c) storing the thermal asperity event information;
   d) receiving read/write enable signals to track a number of thermal asperity detect items;
   e) accessing the stored thermal asperity event information; and
   f) determining erasure locations for the interleaved data bytes from the stored thermal asperity event information.

10. The method as recited in claim 9, wherein the thermal asperity event information includes a thermal asperity duration, a starting interleave number, and a starting interleave address of the thermal asperity signal.

11. The method as recited in claim 10, wherein the data bytes in the data sector are interleaved in i-way from 0 to (i−1) interleaves, where i is an integer greater than 1, wherein the thermal asperity signal indicates the error burst in a plurality of consecutive data bytes in the data sector.

12. The method as recited in claim 11, wherein the starting interleave number and the starting interleave address are determined by performing a binary division using a total number of data bytes in the data sector as a dividend and i as a divisor.

13. The method as recited in claim 10, wherein the thermal asperity event information determination further includes generating a plurality of thermal asperity event information from up to N thermal asperity signals, one thermal asperity event information per thermal asperity signal.

14. The method as recited in claim 13, wherein the thermal asperity event information storing includes storing up to N thermal asperity event information.

15. The method as recited in claim 13, wherein the thermal asperity event information storing further includes sequentially storing the thermal asperity event information for a current data sector and a next data sector.

16. The method as recited in claim 15, wherein the thermal asperity event information accessing further includes accessing the stored thermal asperity event information for the current sector for decoding while the thermal asperity event information is being received for the next data sector.

17. The method as recited in claim 11, wherein the erasure location determining further includes determining an erasure location for decoding a current data byte that has a current interleave number.

18. The method as recited in claim 11, wherein the erasure location determining further includes determining erasure locations for decoding data bytes corresponding to the error burst.

19. An apparatus for generating erasure locations from a thermal asperity signal that indicates an error burst in a data sector having a plurality of interleaved data bytes, the apparatus comprising:

means for receiving a thermal asperity signal;

means for determining a thermal asperity event information that characterizes the received thermal asperity signal;

means for storing the thermal asperity event information;

means for tracking thermal asperity detect items, the means for tracking including receiving read/write enable signals; and means for determining erasure locations for the interleaved data bytes from the stored thermal asperity event information.

20. The apparatus as recited in claim 19, wherein the thermal asperity event information includes a thermal asperity duration, a starting interleave number, and a starting interleave address of the thermal asperity signal.

21. The apparatus as recited in claim 20, wherein the data bytes in the data sector are interleaved in i-way from 0 to (i−1) interleaves, where i is an integer greater than 1, wherein the thermal asperity signal indicates the error burst in a plurality of consecutive data bytes in the data sector.

22. The apparatus as recited in claim 21, wherein the starting interleave number and the starting interleave address are determined by performing a binary division using a total number of data bytes in the data sector as a dividend and i as a divisor.

23. The apparatus as recited in claim 20, wherein the thermal asperity event information determining means generates a plurality of thermal asperity event information from up to N thermal asperity signals, one thermal asperity event information per thermal asperity signal.

24. The apparatus as recited in claim 23, wherein the thermal asperity event information storing means stores up to N thermal asperity event information.

25. The apparatus as recited in claim 23, wherein the thermal asperity event information storing means sequentially stores the thermal asperity event information for a current data sector and a next data sector.

26. The method as recited in claim 25, wherein the erasure location determining means accesses the stored thermal asperity event information for the current sector for decoding while the thermal asperity event information is being received for the next data sector.

* * * * *